US007616314B2

(12) United States Patent
Kreysar et al.

(10) Patent No.: US 7,616,314 B2
(45) Date of Patent: Nov. 10, 2009

(54) METHODS AND APPARATUSES FOR DETERMINING A COLOR CALIBRATION FOR DIFFERENT SPECTRAL LIGHT INPUTS IN AN IMAGING APPARATUS MEASUREMENT

(75) Inventors: Douglas Kreysar, Duvall, WA (US); Matthew Lekson, Woodinville, WA (US); Gary Robert Pedeville, Duvall, WA (US)

(73) Assignee: Radiant Imaging, Inc., Duvall, WA (US)

( * ) Notice: Subject to any disclaimer, the term of this patent is extended or adjusted under 35 U.S.C. 154(b) by 665 days.

(21) Appl. No.: 11/343,501

(22) Filed: Jan. 30, 2006

(65) Prior Publication Data

US 2007/0177230 A1 Aug. 2, 2007

(51) Int. Cl.
  *G01N 21/25* (2006.01)
(52) U.S. Cl. .................. 356/405; 348/191; 348/189; 356/218; 356/406; 356/419
(58) Field of Classification Search ......... 348/180–191; 356/388–394, 243.1–243.8, 300–334, 405, 356/406, 419, 218
See application file for complete search history.

(56) References Cited

U.S. PATENT DOCUMENTS

| 5,805,213 | A | | 9/1998 | Spaulding et al. |
| 5,821,993 | A | * | 10/1998 | Robinson ................. 348/187 |
| 6,690,383 | B1 | * | 2/2004 | Braudaway et al. ......... 345/600 |
| 6,724,422 | B1 | | 4/2004 | Werner |
| 7,133,159 | B2 | * | 11/2006 | Yang et al. .................. 358/1.9 |
| 2003/0147053 | A1 | * | 8/2003 | Matsuda et al. ............... 353/31 |
| 2003/0169347 | A1 | * | 9/2003 | Jenkins .................... 348/222.1 |
| 2003/0193566 | A1 | * | 10/2003 | Matsuda et al. ............. 348/189 |
| 2004/0165068 | A1 | * | 8/2004 | Jane .......................... 348/189 |
| 2007/0052735 | A1 | * | 3/2007 | Chou ........................ 345/690 |
| 2007/0139644 | A1 | * | 6/2007 | Lekson et al. ............... 356/218 |

OTHER PUBLICATIONS

U.S. Appl. No. 11/314,959, Lekson et al.
Jenkins, David, et al. "Digital Imaging Colorimeter for Fast Measurement of Chromaticity Coordinate and Luminance Uniformity of Displays." SPIE vol. 4295, Apr. 2001, p. 176-187.

* cited by examiner

*Primary Examiner*—Jason Chan
*Assistant Examiner*—Antoinette T Spinks
(74) *Attorney, Agent, or Firm*—Perkins Coie LLP

(57) ABSTRACT

Methods and apparatuses for determining a color calibration for different spectral light inputs in an imaging apparatus measurement are disclosed herein. In one embodiment, for example, a method for determining a color calibration for different spectral light inputs in an imaging apparatus measurement can include creating a reference color calibration and a reference luminance scaling calibration for each of a plurality of colors. The method can also include measuring a reference gray value R, G, B for each color in an image measurement of the light source. The method can further include calculating an R, G, B gray value for a first pixel in each of three filtered image measurements. The method can then include calculating pixel ratio values from each of the three first pixel gray values and comparing the reference gray values to the pixel ratio values to determine which one or more reference gray values are closest to the pixel ratio values. The method further includes calculating X, Y, Z values for the first pixel in the image measurement, and then repeating the steps of the method beginning with calculating an R, G, B gray value for each subsequent pixel in the image measurement.

27 Claims, 5 Drawing Sheets

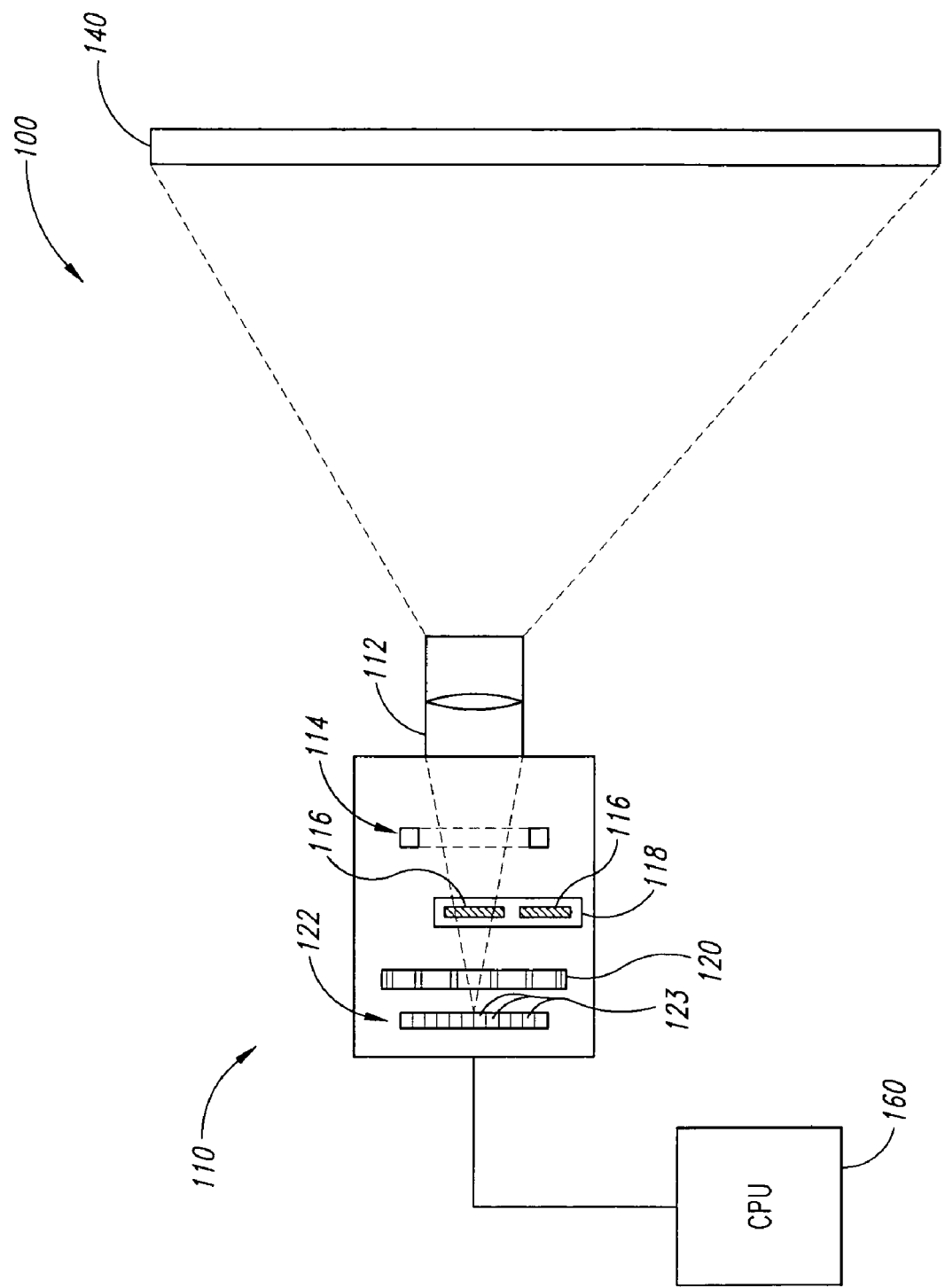

METHODS AND APPARATUSES FOR DETERMINING A COLOR CALIBRATION FOR DIFFERENT SPECTRAL LIGHT INPUTS IN AN IMAGING APPARATUS MEASUREMENT

TECHNICAL FIELD

The present invention is directed generally toward methods and apparatuses for determining a color calibration for different spectral light inputs in an imaging apparatus measurement.

BACKGROUND

It is often desired to know the color of light emitted by a light source (e.g., a visual display, illumination system, or any other surface or volume that emits, transmits, or reflects optical radiation) in order to characterize its performance. The measured spectral data may be mathematically analyzed to determine the color of the light defined by a standard color space. Commonly used color spaces for illumination systems include, for example, the (a) CIE (Commission Internationale de l'Eclairage) 1931 (x, y) chromaticity coordinates, and (b) CIE 1964 (u', v') chromaticity coordinates.

One conventional process for testing visual displays or other light sources includes taking "spot" measurements with a spectroradiometer at a number of different portions of the display. A spectroradiometer, which is generally the most accurate instrument for determining the color of light in quantifiable units, captures the power per wavelength of visible light emitted by a light source, denoted by $S(\lambda)$. The spectroradiometer is able to calculate the CIE 1931 tristimulus values by employing the following formulas defined by CIE:

$$X = \int_{380\ nm}^{780\ nm} S(\lambda)x(\lambda)d\lambda \quad (1)$$

$$Y = \int_{380\ nm}^{780\ nm} S(\lambda)y(\lambda)d\lambda \quad (2)$$

$$Z = \int_{380\ nm}^{780\ nm} S(\lambda)z(\lambda)d\lambda \quad (3)$$

In the above formulas, $x(\lambda)$, $y(\lambda)$ and $z(\lambda)$ are the CIE 1931 2 degree standard observer color matching functions specifically defined by the CIE to serve as international definitions for the CIE 1931 (x, y) color space. The chromaticity coordinates are then determined by the following formulas:

$$x = \frac{X}{X+Y+Z} \quad (4)$$

$$y = \frac{Y}{X+Y+Z} \quad (5)$$

If the spectroradiometer has been accurately calibrated to measure the spectral content of light, there is no further calibration required of a spectroradiometer to measure the CIE 1931 tristimulus values and precisely calculate the 1931 chromaticity coordinates (x, y). However, despite the fact that spectroradiometers can generally provide accurate results when testing light sources, such processes are far too slow for production applications where many individual spot measurements are required, and are generally unable to measure a large area.

Another approach for measuring visual displays or other light sources includes the use of an imaging photometer (e.g., a charge coupled device (CCD) or a complementary metal oxide semiconductor (CMOS) imaging system). A CCD system, for example, can substantially improve the speed and efficiency of testing such displays because a CCD array can include a large number of detectors and, accordingly, a single measurement with the CCD system can include a very large number of test points (e.g., in excess of $1\times10^6$). Rather than taking many separate spot measurements of a visual display (as necessary with the above-described spectroradiometer), the CCD system can image the entire display simultaneously and capture many thousands or millions of points in just seconds.

Measuring displays with CCD systems, however, also includes several drawbacks. CCD imaging systems generally use several color filters (e.g., three or more filters, usually including red, green, and blue filters) through which light is measured. A color calibration (e.g., a matrix or other set of correction factors) is then applied to the measured filtered light to calculate the measured values in terms of tristimulus values, which correlates to the human eye response. Typically, the transmission of these filters, in combination with the camera and lens response, does not exactly match the tristimulus curves. One way to overcome this problem is to try to include additional color filters. This method can increase the accuracy of the camera, but only for the spectrum that the additional curves measure. For example, a color filter that is centered only in a narrow red region cannot help in the blue region. Additionally, this method adds a costly component to the system and can substantially slow down the measurement process. Accordingly, there is a need to improve the systems and methods for determining color calibrations for image measurements.

BRIEF DESCRIPTION OF THE DRAWINGS

FIG. 1A is a block diagram of a system for determining a color calibration for different spectral light inputs in an imaging apparatus measurement in accordance with several embodiments of the invention.

DETAILED DESCRIPTION

A. Overview

Figure 1B:
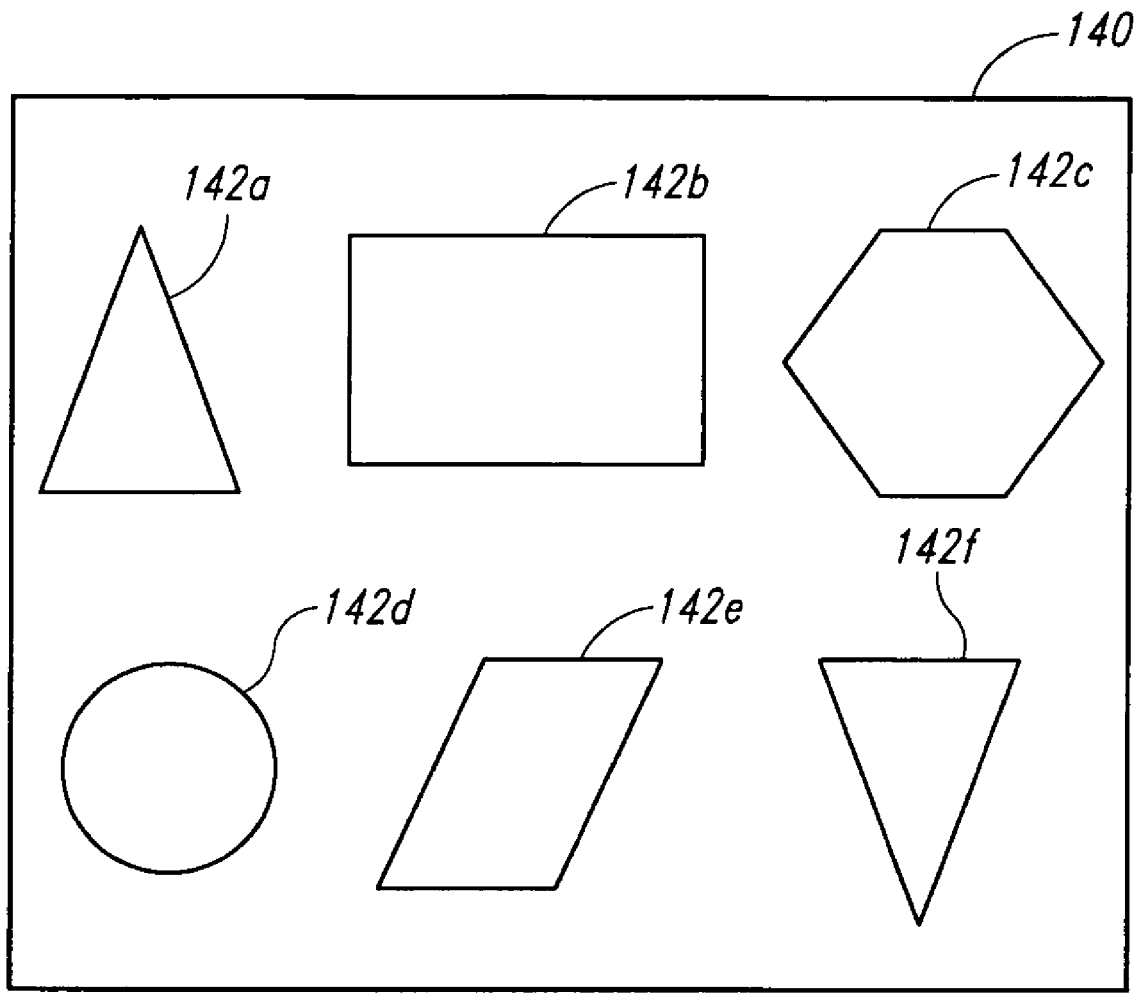
FIG. 1B is a front view of the visual display of FIG. 1A.

The present disclosure describes methods and apparatuses for determining a color calibration for different spectral light inputs in an imaging apparatus measurement. In one particular embodiment, for example, a method for determining a color calibration for different spectral light inputs in an imaging apparatus measurement can include creating a reference color calibration and a reference luminance scaling calibration for each of a plurality of colors. The method can also include measuring a reference gray value R, G, B for each color in an image measurement of the light source. In several embodiments, the R, G, B values can be normalized as if they were each based on the same exposure time. The method can further include calculating an R, G, B gray value for a first pixel in each of three filtered image measurements. The three filtered measurements, for example, can include a first filtered image measurement taken using a red color filter, a second filtered image measurement taken using a green color filter, and a third filtered image measurement taken using a blue color filter. The method can then include calculating pixel ratio values from each of the three first pixel gray values and comparing the reference gray values to the pixel ratio values to determine which one or more reference gray values are closest to the pixel ratio values. The method further includes calculating X, Y, Z values for the first pixel in the image measurement, and then repeating the steps of the method beginning with calculating an R, G, B gray value for each subsequent pixel in the image measurement.

Many specific details of certain embodiments of the invention are set forth in the following description and in FIGS. 1A-4 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

B. Embodiments of Methods and Apparatuses for Determining a Color Calibration for Different Spectral Light Inputs in an Imaging Apparatus Measurement FIG. 1A is a block diagram of a system 100 for determining a color calibration for different spectral light inputs in an imaging apparatus measurement in accordance with several embodiments of the invention. The system 100 can include an imaging photometer 110, a light source (e.g., a visual display) 140 positioned for measurement, and an interface 160 operably coupled to the imaging photometer 110 for processing image data captured from the visual display 140. The system 100 and the corresponding methods described below are configured to allow a user to adaptively determine color calibrations automatically or "on the fly" and apply such calibrations to an image measurement.

The photometer 110 is positioned at a desired distance from the visual display 140 and configured to capture one or more image measurements from the visual display 140. The distance between the photometer 110 and the visual display 140 can vary depending on the size of visual display 140 and the configuration of the photometer 110. In several embodiments, the photometer 110 can include a CCD digital camera. Suitable CCD-based digital cameras include the ProMetric® 1000 series imaging photometer and calorimeters, the ProMetric® 1400 series imaging photometer and calorimeters, and the ProMetric® 1600 series imaging photometer, radiometer, and calorimeters, which are commercially available from the assignee of the present invention, Radiant Imaging, 15321 Main St. NE, Suite 310, Duvall, Wash. In other embodiments, other CCD-based or CMOS-based cameras may be used.

The imaging photometer 110 can include an imaging lens assembly 112 including one or more lenses (only one lens is shown in the lens assembly 112 of FIG. 1) and a lens aperture 114. The lens assembly 112 is configured to enable the imaging photometer 110 to have sufficient resolution to resolve a desired imaging area on the visual display 140. The lens assembly 112 can include a standard fixed focal length lens (e.g., a 50 mm focal length Nikon mount lens), a zoom lens, or a microscopic lens. In other embodiments, a number of different lenses can be used as long as the particular lens provides sufficient resolution and field-of-view for the imaging photometer 110 to adequately capture image data from the visual display 140.

The imaging photometer 110 can also include a number of color filters 116 in a computer-controlled filter wheel 118 and a mechanical shutter 120. The imaging photometer 110 further includes a CCD imaging array 122 having a plurality of pixels 123 arranged in a two-dimensional grid array. The pixels 123 of the CCD imaging array 122 are light-sensitive cells capable of producing an electrical charge proportional to the amount of light they receive. The number of pixels 123 in the horizontal or x-direction and the number of pixels 123 in the vertical or y-direction constitute the resolution of the CCD imaging array 122. The resolution of the CCD imaging array 122 should be sufficient to capture a desired imaging area on the visual display 140. In other embodiments, the CCD imaging array 122 can have a different arrangement of pixels or, as mentioned previously, the imaging array 122 can include a CMOS image sensor. In other embodiments, the imaging photometer 110 can include other features and/or the features described above can have a different arrangement within the photometer. In still further embodiments, the system 100 can include other suitable imaging devices in lieu of, or in addition to, the imaging photometer 110.

FIG. 1B is a front view of the visual display 140. Referring to FIGS. 1A and 1B together, the visual display 140 includes a number of pixels (not shown) and can include a number of different areas having different spectral characteristics (i.e., different colors). As best seen in FIG. 1B, for example, the visual display 140 includes six different areas (shown as areas 142a-f) with each area having a different color and/or different spectral characteristic. In other embodiments, the visual display 140 can include a different number of areas with different spectral characteristics.

As mentioned above, the interface 160 is operably coupled to the imaging photometer 110 to receive and process the image data captured from the visual display 140. The interface 160, for example, can include image software to extract the brightness and color data (i.e., luminance $L_v$ and chromaticity coordinates ($C_x$, $C_y$), respectively) from the image data. The interface 160 can also include a database to store image data and calculated calibration or correction data. The image software is flexible enough to properly find and measure the visual display 140, even if the alignment of the imaging photometer 110 and the visual display 140 is not ideal. Further, the image software is adaptable to various sizes and configurations of visual displays 140. Suitable image software for the interface 160, such as ProMetric® 8.5 software, is commercially available from Radiant Imaging. Methods for using the image software to adaptively determine a color calibration for different spectral light inputs are discussed in detail below with reference to FIGS. 2-4.

In operation, the imaging photometer 110 can capture an image from the visual display 140 that includes image data from the various areas 142a-f of the visual display 140 having different colors and/or spectral characteristics. The captured image data is transferred from the imaging photometer 110 to the interface 160. The interface 160 compiles and manages the image data from the imaging photometer 110 and performs a series of calculations to determine the appropriate correction factors (e.g., color calibration and luminance scaling) that should be made to the image data at each portion of the image measurement. The image data is adjusted accordingly and the post-processed image measurement can then be displayed or saved for further processing.

Figure 2:
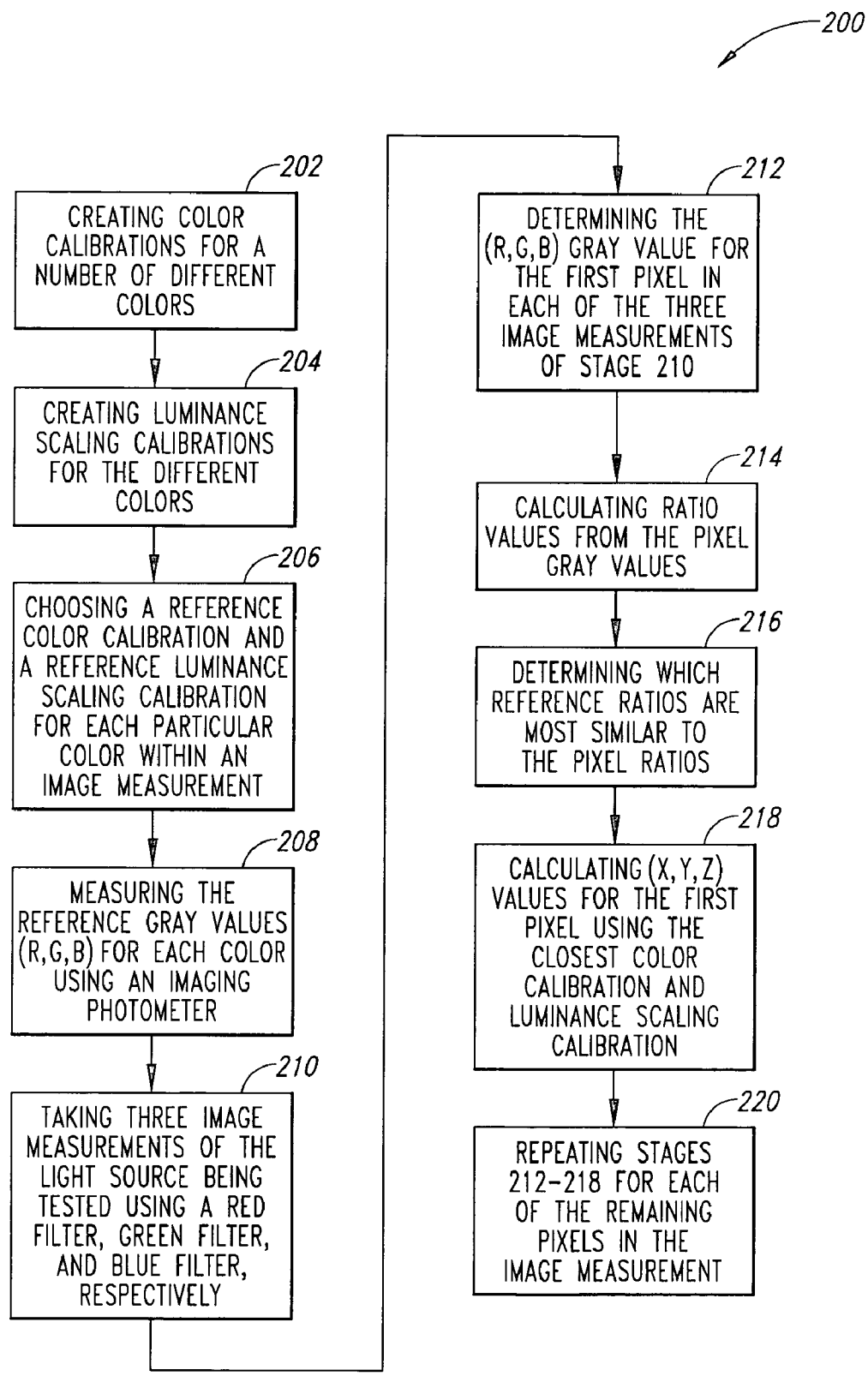
FIG. 2 is a flowchart illustrating various stages of a method for determining a color calibration for different spectral light inputs in an imaging apparatus measurement in accordance with an embodiment of the invention.

FIG. 2 is a flowchart illustrating various stages of a method 200 for determining a color calibration for different spectral light inputs in an imaging apparatus measurement in accordance with one embodiment of the invention. The method 200, for example, can be performed using the system 100 described above with respect to FIGS. 1A and 1B. In other embodiments, however, the method 200 can be performed using other suitable systems having different configurations.

Beginning at stage 202, the method 200 includes creating color calibrations for a number of different colors. The calibrations are optimized for each particular color. Suitable methods for creating the color calibrations include a "one-color" method as disclosed in U.S. patent application Ser. No. 10/092,417, now U.S. Pat. No. 7,012,633, issued Mar. 14, 2006, which is incorporated herein by reference in its entirety. In other embodiments, a four-color calibration technique as proposed by the National Institute of Standards and Technology (NIST) for display measurements could be used to create the color calibrations. In still further embodiments, other suitable methods can be used to create the color calibration database.

The color calibrations of stage 202 can be used to determine the color space difference between the color space measured using an imaging apparatus (e.g., an imaging photometer as described above) and a standard colorimetric color space (e.g., CIE 1931). More specifically, stage 202 includes calculating calibration or correction matrices for each of the particular colors. For example, for each particular area of the measurement having a particular spectral characteristic (i.e., color), there is a unique matrix $M_i$ (where i=the number of different areas having specific spectral characteristics) that can supply the correct weighting factors such that $$M_i \begin{pmatrix} F_1 \\ F_2 \\ \vdots \\ F_n \end{pmatrix} = \begin{pmatrix} X \\ Y \\ Z \end{pmatrix} \quad (6)$$

where the values $F_1, F_2 \ldots F_n$ define the color space measured with the imaging apparatus, n is the number of color filters used in the imaging apparatus, and the values X, Y, Z define the standard colorimetric color space.

Referring next to stage 204, the method 200 includes creating luminance scaling calibrations for each of the different colors. The luminance scalings, for example, can be created using existing methods for creating a relationship between the values measured through the filters of the image apparatus and luminance L. The individual luminance scalings are optimized for each different color. Luminance L is generally the Y value of the standard color space and, therefore, $M_i$ can be used to calculate luminance L.

Figure 3:
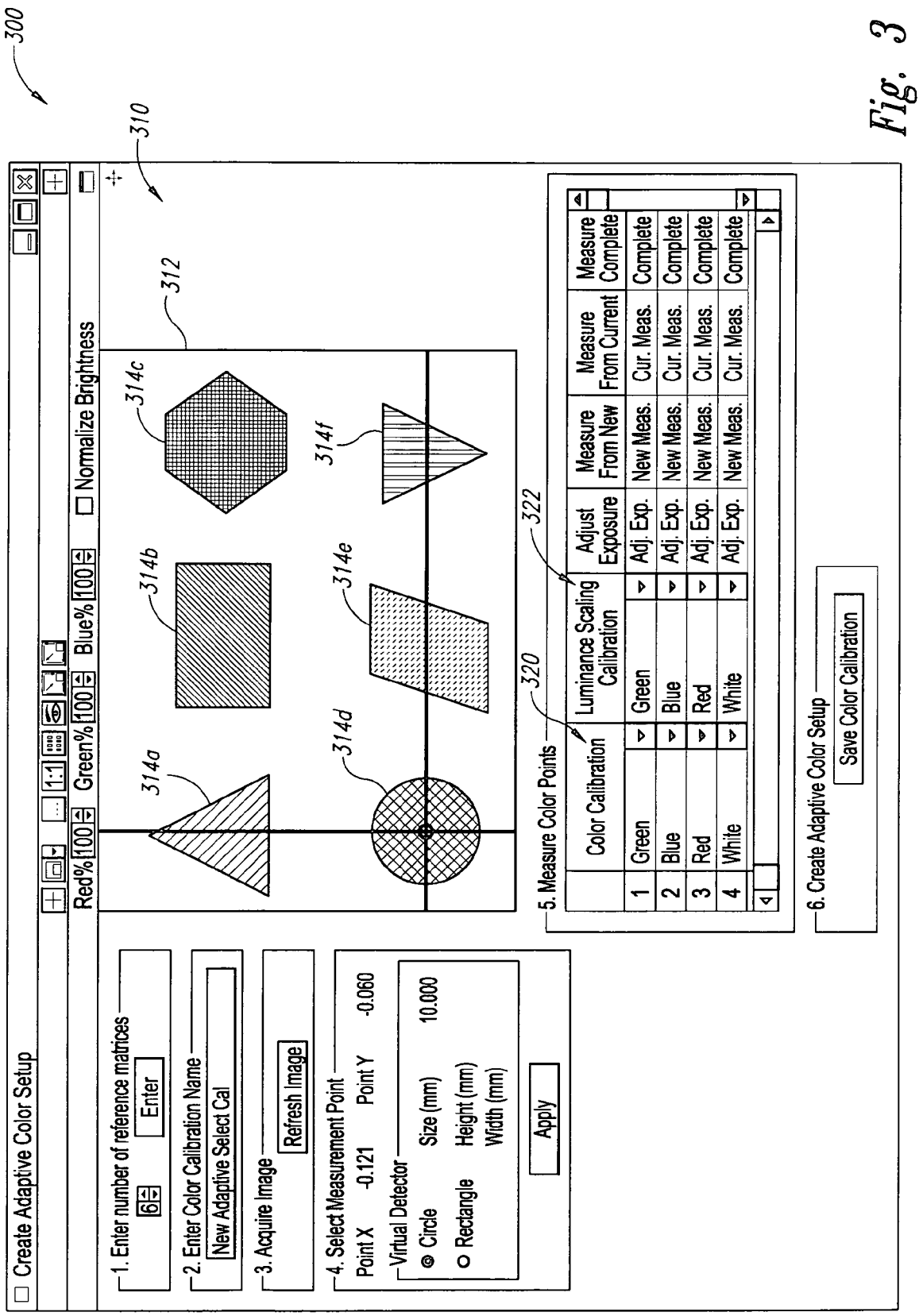
FIG. 3 is a display diagram or screenshot of a stage in the method of FIG. 2 for determining a color calibration for different spectral light inputs in accordance with an embodiment of the invention.

At stage 206, the method 200 includes choosing a reference color calibration and a reference luminance scaling calibration for each particular color within an image measurement. The reference calibrations can be chosen from the reference calibrations created in stages 202 and 204 above. FIG. 3, for example, is a display diagram or screen shot of a calibration setup page 300 in accordance with an embodiment of stage 206. The calibration setup page 300 includes a view window 310 illustrating an image measurement 312 from a light source (e.g., a visual display) being tested. In the embodiment illustrated in FIG. 3, for example, the image measurement 312 includes a number of different areas or portions having different colors (shown as areas 314a-f). The calibration setup page 300 illustrated in FIG. 3 is provided for illustration purposes only and, accordingly, in other embodiments the page 300 can have a different arrangement or include different features.

The user (not shown) can select a particular area 314 and then click on a desired color calibration 320 and luminance scaling calibration 322 for the selected area 314. In the illustrated embodiment, for example, the user has selected the area 314d, and then selected the "blue" color calibration 320 and the "blue" luminance scaling calibration 322. This process can be repeated a number of times for each particular area 314 within the image measurement 312. In other embodiments, this process can be repeated any number of times for selected areas within an image measurement.

Referring back to FIG. 2, stage 208 of the method 200 includes measuring the reference gray values c for each color using an imaging photometer with three color filters (e.g., a red filter, a green filter, and a blue filter). In this embodiment, R, G, and B represent $F_1$, $F_2$, and $F_3$, respectively, in Equation 6. The measured values are then normalized as if they had the same exposure times. For example, the following formulas can be used to normalize the values:

$$R_{ref} = R * \frac{(Exp\ Ref)}{(Exp\ Red)} \quad (7)$$

$$G_{ref} = G * \frac{(Exp\ Ref)}{(Exp\ Green)} \quad (8)$$

$$B_{ref} = B * \frac{(Exp\ Ref)}{(Exp\ Blue)} \quad (9)$$

where the values $R_{ref}$, $G_{ref}$, and $B_{ref}$ define the reference gray values, the value Exp Ref defines an arbitrary reference exposure, and the values Exp Red, Exp Green, and Exp Blue define the exposures for the three images. After normalizing the gray values, the reference gray values $R_{ref}$, $G_{ref}$, $B_{ref}$ and the reference color calibrations and luminance scaling calibrations are saved in a reference table.

At stage 210, the method 200 includes taking three different image measurements of the light source being tested using the imaging photometer. The first measurement is taken using a red filter, the second measurement with a green filter, and the third measurement with a blue filter. The method then includes calculating ratios from each of the entries in the reference table created in stage 208. The ratios can be calculated using the following formulas:

$$Red_{Ratio} = \frac{R_{ref}}{(R_{ref} + G_{ref} + B_{ref})} \quad (10)$$

$$Green_{Ratio} = \frac{G_{ref}}{(R_{ref} + G_{ref} + B_{ref})} \quad (11)$$

$$Blue_{Ratio} = \frac{B_{ref}}{(R_{ref} + G_{ref} + B_{ref})} \quad (12)$$

where $Red_{Ratio}$, $Green_{Ratio}$, and $Blue_{Ratio}$ define the calculated reference ratios.

The method 200 then includes determining the R, G, B gray value at stage 212 for the first pixel in each of the three image measurements taken in stage 210. The gray values are normalized as if they had the same exposure time using the following formulas:

$$R_{Pixel} = R * \frac{(Exp\ Ref)}{(Exp\ Red)} \quad (13)$$

$$G_{Pixel} = G * \frac{(Exp\ Ref)}{(Exp\ Green)} \quad (14)$$

$$B_{Pixel} = B * \frac{(Exp\ Ref)}{(Exp\ Blue)} \quad (15)$$

where $R_{Pixel}$, $G_{Pixel}$, and $B_{Pixel}$ define the normalized pixel gray value.

At stage 214, the method 200 continues by calculating ratio values from the pixel gray values. The ratio values, for example, can be calculated as follows:

$$RedRatio_{Pixel} = \frac{R_{Pixel}}{(R_{Pixel} + G_{Pixel} + B_{Pixel})} \quad (16)$$

$$GreenRatio_{Pixel} = \frac{G_{Pixel}}{(R_{Pixel} + G_{Pixel} + B_{Pixel})} \quad (17)$$

$$BlueRatio_{Pixel} = \frac{B_{Pixel}}{(R_{Pixel} + G_{Pixel} + B_{Pixel})} \quad (18)$$

The method 200 continues at stage 216 by determining which calculated reference ratio is closest (i.e., the smallest distance) or most similar to the pixel ratios:

$$(Distance)^2 = (Red_{Ratio} - RedRatio_{Pixel})^2 + (Green_{Ratio} - GreenRatio_{Pixel})^2 \quad (19)$$

In other embodiments, however, $(Distance)^2$ can be calculated as follows:

$$(Distance)^2 = (Red_{Ratio} - RedRatio_{Pixel})^2 + (Green_{Ratio} - GreenRatio_{Pixel})^2 + (Blue_{Ratio} - BlueRatio_{Pixel})^2 \quad (20)$$

In still further embodiments, $(Distance)^2$ can be determined using other suitable methods.

At stage 218, the method 200 includes calculating X, Y, Z values for the first pixel in the image measurement using the closest color calibration and luminance scaling calibration. In one embodiment, the method includes looking for the three closest matches and interpolating the X, Y, Z values for the first pixel using the three known values. In other embodiments, however, the method can include looking for a different number of matches within the stored calibrations to determine the X, Y, Z values for the first pixel.

At stage 220, the method 200 then includes repeating stages 212-218 for each of the remaining pixels in the image measurement. Thus, each pixel in the image measurement will have its own color calibration to convert the measured R, G, B values to X, Y, Z values. The calculated data can then be reformatted to a desired image format and saved in a database for later use, such as post-processing of additional image measurements.

Figure 4:
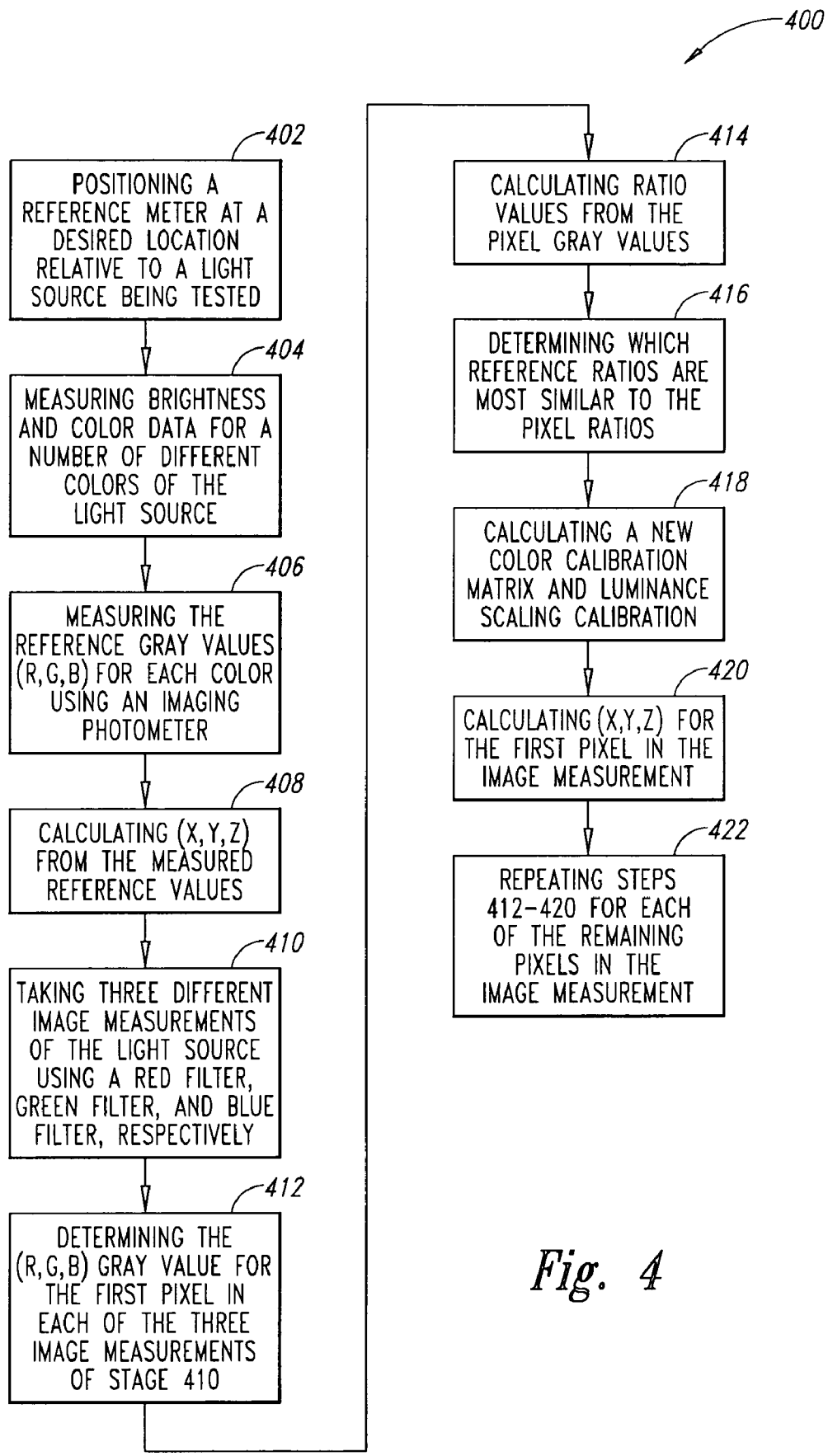
FIG. 4 is a flowchart illustrating various stages of a method for determining a color calibration for different spectral light inputs in an imaging apparatus measurement in accordance with another embodiment of the invention.

FIG. 4 is a flowchart illustrating various stages of a method 400 for determining a color calibration for different spectral light inputs in an imaging apparatus measurement in accordance with another embodiment of the invention. The method 400 can be performed using the system 100 described above with respect to FIGS. 1A and 1B or other suitable systems having different configurations.

Beginning at stage 402, the method 400 includes positioning a reference meter at a desired location relative to a light source being tested. The reference meter can include a spectroradiometer or another suitable device. At stage 402, the method 400 includes measuring brightness and color data (i.e., luminance ($L_v$) and chromaticity coordinates ($C_x$, $C_y$), respectively) for a number of different colors of the light source. The reference meter, for example, can be used to measure and analyze the data. The measured values are recorded in a reference table. In other embodiments, the brightness and color data for the various colors can be pre-measured and recorded in the reference table without setting up the reference meter. In still further embodiments, other suitable methods can be used to measure and record the desired values in the reference table.

Referring next to stage 406, the method 400 includes measuring the reference gray values (R, G, B) for each color using an imaging photometer. The measured values are then normalized as if they had the same exposure times. For example, the following formulas can be used to normalize the measured values:

$$R_{ref} = R * \frac{(Exp\ Ref)}{(Exp\ Red)} \quad (21)$$

$$G_{ref} = G * \frac{(Exp\ Ref)}{(Exp\ Green)} \quad (22)$$

$$B_{ref} = B * \frac{(Exp\ Ref)}{(Exp\ Blue)} \quad (23)$$

where the values $R_{ref}$, $G_{ref}$, and $B_{ref}$ define the reference gray values, the value Exp Ref defines an arbitrary reference exposure, and the values Exp Red, Exp Green, and Exp Blue define the exposures for the three images.

The method 400 continues at stage 408 by calculating X, Y, Z values from the measured reference values. More specifically, X, Y, Z can be calculated as follows:

$$z = 1 - x - y \quad (24)$$

$$Y = L \quad (25)$$

$$X = x * \frac{Y}{y} \quad (26)$$

-continued $$Z = z * \frac{Y}{y} \quad (27)$$

where X, Y, Z define the standard color metric color space. The reference gray values $R_{ref}$, $G_{ref}$, $B_{ref}$ and reference X, Y, Z values are then saved in the reference table.

At stage 410, the method 400 includes taking three different image measurements of the light source being tested using the imaging photometer. The first measurement is taken using a red filter, the second measurement with a green filter, and the third measurement with a blue filter. The method then includes calculating ratios from each of the entries in the reference table. The ratios can be calculated using the following formulas:

$$Red_{Ratio} = \frac{R_{ref}}{(R_{ref} + G_{ref} + B_{ref})} \quad (28)$$

$$Green_{Ratio} = \frac{G_{ref}}{(R_{ref} + G_{ref} + B_{ref})} \quad (29)$$

$$Blue_{Ratio} = \frac{B_{ref}}{(R_{ref} + G_{ref} + B_{ref})} \quad (30)$$

where $Red_{Ratio}$, $Green_{Ratio}$, and $Blue_{Ratio}$ define the calculated reference ratios.

The method 400 then includes determining the R, G, B gray value at stage 412 for the first pixel in each of the three image measurements taken in stage 410. The gray values are normalized as if they had the same exposure time using the following formulas:

$$R_{Pixel} = R * \frac{(Exp\ Ref)}{(Exp\ Red)} \quad (31)$$

$$G_{Pixel} = G * \frac{(Exp\ Ref)}{(Exp\ Green)} \quad (32)$$

$$B_{Pixel} = B * \frac{(Exp\ Ref)}{(Exp\ Blue)} \quad (33)$$

where $R_{Pixel}$, $G_{Pixel}$, and $B_{Pixel}$ define the normalized pixel gray value.

At stage 414, the method 400 continues by calculating ratio values from the pixel gray values. The ratio values can be calculated as follows:

$$RedRatio_{Pixel} = \frac{R_{Pixel}}{(R_{Pixel} + G_{Pixel} + B_{Pixel})} \quad (34)$$

$$GreenRatio_{Pixel} = \frac{G_{Pixel}}{(R_{Pixel} + G_{Pixel} + B_{Pixel})} \quad (35)$$

$$BlueRatio_{Pixel} = \frac{B_{Pixel}}{(R_{Pixel} + G_{Pixel} + B_{Pixel})} \quad (36)$$

The method 400 continues at stage 416 by determining which four reference ratios are closest (i.e., the smallest distance) or most similar to the pixel ratios.

$$(Distance)^2 = (Red_{Ratio} - RedRatio_{Pixel})^2 + (Green_{Ratio} - GreenRatio_{Pixel})^2 \quad (37)$$

In other embodiments, however, (Distance)$^2$ can be calculated as follows:

$$(Distance)^2 = (Red_{Ratio} - RedRatio_{Pixel})^2 + (Green_{Ratio} - GreenRatio_{Pixel})^2 + (Blue_{Ratio} - BlueRatio_{Pixel})^2 \quad (38)$$

In further embodiments, the method 400 can include comparing a different number of reference ratios to the pixel ratio and/or the reference ratios can be selected based on other attributes besides distance, such as the orthogonality relative to each other or other suitable methods of comparing the reference ratios to the pixel ratio.

Referring to stage 418, the method 400 includes calculating a new color calibration matrix and luminance scaling calibration using the one-color calibration method referenced above, the four-color calibration method proposed by NIST, or other suitable methods. The color calibration matrix and luminance scalings can be used to determine the color space difference between the R, G, B color space measured using the imaging photometer and a standard colorimetric color space.

At stage 420, the method 400 includes calculating X, Y, Z values for the first pixel in the image measurement. The method 400 then continues at stage 422 by repeating stages 410-420 for each of the remaining pixels in the image measurement. Accordingly, each pixel in the image measurement will have its own unique color calibration matrix to convert the measured R, G, B values to X, Y, Z values. The calculated data can then be reformatted to a desired image format and saved in a database for later use, such as post-processing of additional image measurements.

One feature of at least some of the embodiments of the methods 200 and 400 described above with reference to FIGS. 2-4 is that the methods do not store complete color calibrations, and instead use color reference values that are used to compute color calibrations automatically or "on the fly" and apply such calibrations to an image measurement. Another feature of at least some of the embodiments of the methods 200 and 400 described above is that the color reference values encompass as many colors as possible (e.g., red, green, blue, magenta, cyan, etc.) and are not merely centered around or based on a white color. One advantage of these features is that they are expected to significantly improve the accuracy of the resulting color calibrations compared with conventional systems because the color calibrations are determined using a pixel-by-pixel process that includes a large amount of reference color data.

From the foregoing, it will be appreciated that specific embodiments of the invention have been described herein for purposes of illustration, but that various modifications may be made without deviating from the invention. Aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. A method for determining a color calibration for different spectral light inputs in an imaging apparatus measurement, the method comprising:
   creating a reference color calibration and a reference luminance scaling calibration for each of a plurality of colors;

measuring a reference gray value R, G, B for each color in an image measurement of the light source;

calculating an R, G, B gray value for a first pixel in each of three filtered image measurements;

calculating pixel ratio values from each of the three first pixel gray values;

comparing the reference gray values to the pixel ratio values to determine which one or more reference gray values are most similar to the pixel ratio values;

calculating X, Y, Z values for the first pixel in the image measurement; and repeating the calculating an R, G, B gray value, calculating pixel ratio values, comparing the reference gray values, and calculating X, Y, Z values steps for each subsequent pixel in the image measurement.

2. The method of claim 1 wherein creating a reference color calibration and a reference luminance scaling for each of a plurality of colors includes:

determining standard chromaticity coordinates and luminance scalings for each of the plurality of colors; and calculating a specific calibration for each of the plurality of colors using the standard chromaticity coordinates and luminance scalings before measuring a reference gray value R, G, B for each color.

3. The method of claim 2 wherein calculating a specific calibration for each of the plurality of colors includes calculating reference calibration matrices $M_i$ with the following equation $$M_i \begin{pmatrix} F_1 \\ F_2 \\ \vdots \\ F_n \end{pmatrix} = \begin{pmatrix} X \\ Y \\ Z \end{pmatrix}$$

where i equals the number of different colors having specific spectral characteristics, the values $F_1, F_2 \ldots F_n$ define a color space measured with the imaging apparatus, n is the number of color filters used in the imaging apparatus, and the values X, Y, Z define the standard color space.

4. The method of claim 3 wherein creating a reference color calibration and a reference luminance scaling for each of a plurality of colors includes calculating reference luminance scalings for each color using $M_i$ where luminance is generally the Y value of the standard color space.

5. The method of claim 1 wherein creating a reference color calibration and a reference luminance scaling for each of a plurality of colors includes:

positioning a reference meter at a desired position relative to the light source; and measuring brightness and color data for a number of different colors of the light source.

6. The method of claim 5 wherein positioning a reference meter at a desired position relative to the light source includes positioning a spectroradiometer at a desired position relative to the light source.

7. The method of claim 1 wherein calculating an R, G, B gray value for a first pixel in each of three filtered image measurements includes:

capturing three filtered image measurements of the light source, the first filtered image measurement using a red color filter, the second filtered image measurement using a green color filter, and the third filtered image measurement using a blue color filter; and calculating ratio values for each of a plurality of data points in the first, second, and third filtered image measurements.

8. The method of claim 1, further comprising selecting a particular reference color calibration and reference luminance scaling for each color in the image measurement before measuring the reference gray value R, G, B for each color in the image measurement.

9. The method of claim 1, further comprising normalizing the reference gray values R, G, B for each color in the image measurement such that each reference gray value is based on the same reference exposure time.

10. The method of claim 1 wherein calculating X, Y, Z values for the first pixel in the image measurement includes interpolating the X, Y, Z values using the most similar one or more reference color calibrations and reference luminance scaling calibrations.

11. The method of claim 1 wherein calculating X, Y, Z values for the first pixel in the image measurement includes interpolating the X, Y, Z values using the most similar three reference color calibrations and most similar three reference luminance scaling calibrations.

12. The method of claim 1 wherein comparing the reference gray values to the pixel ratio values to determine which one or more reference gray values are most similar to the pixel ratio values includes determining which four reference gray values are most similar to the pixel ratio values.

13. The method of claim 1 wherein the reference color calibration for each of the plurality of colors are first reference color calibration and the reference luminance scaling calibrations for each of the plurality of colors are first reference luminance scaling calibrations, and wherein the method further comprises:

calculating a second reference color calibration and a second luminance scaling calibration for the first pixel using a one-color calibration method, a four-color calibration method, or another suitable method.

14. A method for determining a color calibration for different spectral light inputs in an imaging photometer measurement of a light source, the method comprising:

(a) creating a reference color calibration and a reference luminance scaling calibration for each of a plurality of colors;

(b) selecting a reference color calibration and a reference luminance scaling for each particular color within an image measurement of the light source;

(c) measuring a reference gray value R, G, B for each color in the image measurement;

(d) normalizing the measured reference gray values such that each reference gray value is based on the same exposure time;

(e) capturing three filtered image measurements of the light source with the imaging photometer, the first filtered image measurement using a red color filter, the second filtered image measurement using a green color filter, and the third filtered image measurement using a blue color filter;

(e) calculating an R, G, B gray value for a first pixel in each of the three filtered image measurements;

(f) calculating pixel ratio values from each of the three first pixel gray values;

(g) determining which calculated reference gray values are most similar to the calculated pixel ratio values;

(h) calculating X, Y, Z values for the first pixel in the image measurement using one or more most similar reference color calibrations and one of more reference luminance scaling calibrations; and (i) repeating steps (e)-(h) for each of the remaining pixels in the image measurement.

15. The method of claim 14 wherein creating a reference color calibration and a reference luminance scaling for each of a plurality of colors includes:
   determining standard chromaticity coordinates and luminance scalings for each of the plurality of colors; and
   calculating a specific calibration for each of the plurality of colors using the standard chromaticity coordinates and luminance scalings before measuring a reference gray value R, G, B for each color.

16. The method of claim 15 wherein calculating a specific calibration for each of the plurality of colors includes calculating reference calibration matrices $M_i$ with the following equation $$M_i \begin{pmatrix} F_1 \\ F_2 \\ \vdots \\ F_n \end{pmatrix} = \begin{pmatrix} X \\ Y \\ Z \end{pmatrix}$$

where i equals the number of different colors having specific spectral characteristics, the values $F_1, F_2 \ldots F_n$ define a color space measured with the imaging apparatus, n is the number of color filters used in the imaging apparatus, and the values X, Y, Z define the standard color space.

17. The method of claim 16 wherein creating a reference color calibration and a reference luminance scaling for a plurality of colors includes calculating reference luminance scalings for each color using $M_i$ where luminance is generally the Y value of the standard color space.

18. The method of claim 14 wherein creating a reference color calibration and a reference luminance scaling calibration for a plurality of colors includes using a four-color calibration method.

19. The method of claim 14 wherein measuring a reference gray value R, G, B for each color in the image measurement includes measuring the light source with an imaging photometer including a red color filter, a blue color filter, and a green color filter.

20. The method of claim 14 wherein calculating X, Y, Z values for the first pixel in the image measurement includes interpolating the X, Y, Z values using the most similar three reference color calibrations and most similar three reference luminance scaling calibrations.

21. The method of claim 14, further comprising saving the reference gray values, the reference color calibration, and reference luminance scaling calibrations in a reference table before capturing the three filtered image measurements of the light source.

22. A method for determining a color calibration for different spectral light inputs in an imaging photometer measurement, the method comprising:
   (a) calculating reference color coordinates and reference luminance values for a plurality of colors and recording the reference values in a reference table;
   (b) determining chromaticity coordinates and a luminance value of the first pixel of an image measurement of the light source measured with the photometer;
   (c) comparing the chromaticity coordinates and luminance value of the first pixel to one or more reference color coordinates and reference luminance values stored in the reference table to determine which one or more reference values from the reference table are most similar to the values of the first pixel;
   (d) calculating X, Y, Z values for the first pixel;
   (e) applying the color calibration to the first pixel; and
   (f) repeating steps (b)-(e) for each of the remaining pixels in the image measurement.

23. The method of claim 22, further comprising:
   (g) post-processing the image measurement with the color calibration data for each pixel of the image measurement.

24. The method of claim 22 wherein calculating reference color coordinates and reference luminance values for a plurality of colors includes:
   positioning a reference meter at a desired position relative to the light source; and
   measuring chromaticity coordinates ($C_x$, $C_y$) and luminance ($L_v$) with the reference meter for each of the plurality of colors.

25. The method of claim 22 wherein comparing the chromaticity coordinates and luminance value of the first pixel to one or more reference color coordinates and reference luminance values includes determining which three reference values are most similar to the first pixel values.

26. The method of claim 22 wherein calculating X, Y, Z values for the first pixel includes calculating X, Y, Z values using the three color coordinates and reference luminance values from the reference table that are most similar to the color coordinates and luminance values of the first pixel.

27. The method of claim 22, further comprising calculating a color calibration matrix and luminance scaling calibration before calculating X, Y, Z values for the first pixel, the color calibration matrix and luminance scaling calibration being calculated using a one-color method, a four-color calibration method, or another suitable method.

* * * * *